(12) United States Patent
Takahashi et al.

(10) Patent No.: US 10,900,519 B2
(45) Date of Patent: Jan. 26, 2021

(54) BALL HOUSING BAND AND MOTION GUIDE APPARATUS

(71) Applicant: THK CO., LTD., Tokyo (JP)

(72) Inventors: Toru Takahashi, Tokyo (JP); Ryuichi Yamakoshi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/494,860

(22) PCT Filed: Mar. 26, 2018

(86) PCT No.: PCT/JP2018/012153
§ 371 (c)(1),
(2) Date: Sep. 17, 2019

(87) PCT Pub. No.: WO2018/186220
PCT Pub. Date: Oct. 11, 2018

(65) Prior Publication Data
US 2020/0191199 A1    Jun. 18, 2020

(30) Foreign Application Priority Data

Apr. 7, 2017  (JP) .................................. 2017-076499

(51) Int. Cl.
*F16C 29/06* (2006.01)
*F16C 33/38* (2006.01)
*F16C 33/40* (2006.01)

(52) U.S. Cl.
CPC ........ *F16C 29/0602* (2013.01); *F16C 29/063* (2013.01); *F16C 33/3825* (2013.01); *F16C 33/40* (2013.01)

(58) Field of Classification Search
CPC ........... F16C 29/0602; F16C 29/06038; F16C 33/40; F16C 33/3825

(Continued)

(56) References Cited

U.S. PATENT DOCUMENTS 1,321,687 A * 11/1919 Westman ................ F16C 33/41
384/533
2,557,476 A *  6/1951 Schwitter ............ F16C 33/3831
384/527

(Continued)

FOREIGN PATENT DOCUMENTS

CN        101392793 A      3/2009
CN        105917127 A      8/2016
(Continued)

OTHER PUBLICATIONS

Office Action dated Mar. 31, 2020, issued in counterpart CN Application No. 201880023817.7, with English Translation. (10 pages).

(Continued)

*Primary Examiner* — Marcus Charles
(74) *Attorney, Agent, or Firm* — Westerman, Hattori, Daniels & Adrian, LLP

(57) ABSTRACT

A ball housing band is provided which can encourage increases in precision and rigidity of a motion guide apparatus and make the motion guide apparatus compact. A ball housing band includes: a housing band including a band formed with ends, the band having at least two rows of opening portions, and a plurality of spacers placed between the opening portions of the rows; and at least two rows of balls housed in the at least two rows of the opening portions. One of adjacent rows of and the other row of the balls are placed in a staggered arrangement in a state where the spacers are disposed between the balls and between the balls. The one row of the balls overlap the other row of the balls as viewed in the length direction of the ball housing band.

20 Claims, 13 Drawing Sheets

(58) Field of Classification Search
USPC .................................. 384/43, 44, 45, 49, 523
See application file for complete search history.

(56) References Cited

U.S. PATENT DOCUMENTS

| | | | | |
|---|---|---|---|---|
| 2008/0080796 A1* | 4/2008 | Liao | ..................... | F16C 29/06 384/45 |
| 2008/0219604 A1* | 9/2008 | Chen | ................... | F16C 33/3825 384/43 |
| 2016/0341247 A1 | 11/2016 | Kano | | |

FOREIGN PATENT DOCUMENTS

| | | | | | |
|---|---|---|---|---|---|
| CN | 108779797 A | * | 11/2018 | ............. | F16C 33/42 |
| DE | 102006047945 A1 | * | 4/2008 | .......... | F16C 33/3825 |
| EP | 1308641 A1 | * | 5/2003 | .......... | F16C 33/3825 |
| EP | 2161463 A1 | * | 3/2010 | ............. | F16C 33/46 |
| FR | 2788466 A1 | * | 7/2000 | ............. | F16C 33/50 |
| JP | 2004-26001 A | | 1/2004 | | |
| JP | 2005003195 A | * | 1/2005 | ............. | F16C 33/41 |
| JP | 2006183869 A | * | 7/2006 | ............. | F16C 29/06 |
| JP | 2008-249043 A | | 10/2008 | | |
| JP | 2011-112069 A | | 6/2011 | | |
| JP | 2011137544 A | * | 7/2011 | ............. | F16C 29/06 |
| JP | 2014-55670 A | | 3/2014 | | |

OTHER PUBLICATIONS

International Search Report dated Jun. 12, 2018, issued in counterpart International Application No. PCT/JP2018/012153 (1 page).
Decision to Grant a Patent dated Jul. 2, 2019 in Japanese Application No. 2018-57539 (5 pages).
Notice of Reasons for Refusal dated Feb. 5, 2019 in Japanese Application No. 2018-57539 (6 pages).

* cited by examiner

ENLARGED VIEW OF IV

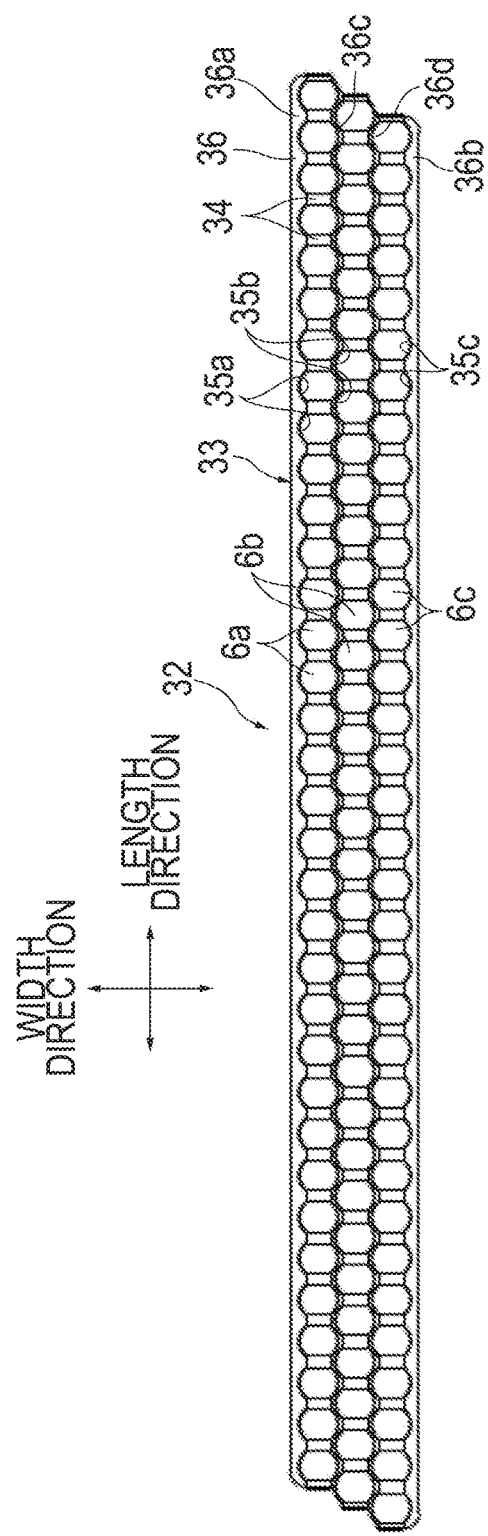
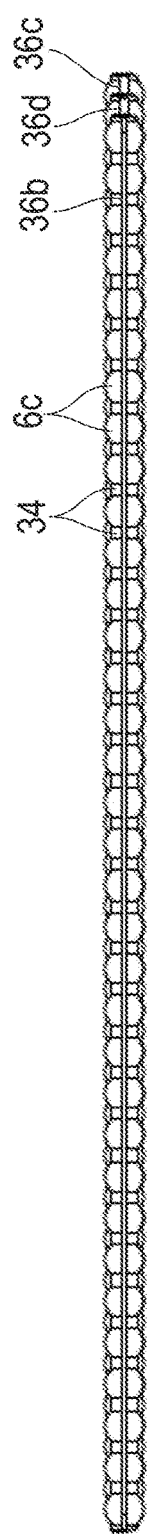

BALL HOUSING BAND AND MOTION GUIDE APPARATUS

TECHNICAL FIELD

The present invention relates to a ball housing band integrated into a circulation path of a motion guide apparatus, and a motion guide apparatus.

BACKGROUND ART

A motion guide apparatus includes a guide rail and a carriage that is assembled to the guide rail via balls as rolling elements in such a manner as to be relatively movable. The motion guide apparatus is used to guide linear motion of a movable body such as a table. The carriage is provided with a circulation path where the ball circulates with the relative movement of the carriage with respect to the guide rail. The circulation path includes a loaded path between the guide rail and the carriage, a return path that is substantially parallel to the loaded path, and a turn path that connects the loaded path and the return path.

When the carriage moves relative to the guide rail, the balls roll along the loaded path between the guide rail and the carriage. At this point in time, the plurality of balls rolls in the same direction. Accordingly, preceding and following balls in the travel direction rub against each other, which hinders the balls from rolling smoothly. In order to prevent it, a ball housing band has been proposed in which a spacer is disposed between balls to prevent contact between the balls (refer to Patent Literature 1).

The ball housing band includes a band that has a row of opening portions and is formed with ends, and a row of balls housed in the opening portions of the band. A spacer is placed between the opening portions of the band to dispose the spacer between the balls.

CITATION LIST

Patent Literature

Patent Literature 1: JP 2008-249043 A

SUMMARY OF INVENTION

Technical Problem

In recent years, motion guide apparatuses using rolling elements such as balls are replacing hydrostatic guides in machines that require a high precision guide, such as precision processing machines, high-precision machining centers, and semiconductor manufacturing apparatuses. Reasons for this include an increase in the precision of a guide of a motion guide apparatus and higher rigidity of a guide of a motion guide apparatus than a hydrostatic guide.

If the number of effective balls in the loaded path (that is, load-bearing balls) can be increased, it is advantageous to increase the precision and rigidity of a motion guide apparatus. Hence, it is conceivable that two rows of balls are placed in the circulation path and the number of effective balls in the loaded path is increased to encourage further increases in precision and rigidity of a motion guide apparatus. However, there is a problem that, simply if two rows of balls are placed in the circulation path, it results in increasing the size of a motion guide apparatus.

Hence, an object of the present invention is to provide a ball housing band that can encourage increases in precision and rigidity of a motion guide apparatus and can make a motion guide apparatus compact, and a motion guide apparatus.

Solution to Problem

In order to solve the above problem, an aspect of the present invention is a ball housing band including: a housing band having a band formed with ends, the band having at least two rows of opening portions, and a plurality of spacers placed between the opening portions of the rows; and at least two rows of balls housed in the at least two rows of opening portions, in which one of adjacent rows of the balls and the other row of the balls are placed in a staggered arrangement in a state where the spacers are disposed between the balls, and the one row of the balls overlap the other row of the balls as viewed in a length direction of the housing band.

Another aspect of the present invention is a motion guide apparatus including: a guide rail; a carriage assembled to the guide rail in such a manner as to be relatively movable, the carriage including a circulation path having a loaded path, a return path substantially parallel to the loaded path, and a turn path connecting the loaded path and the return path; and a ball housing band placed in the circulation path, the ball housing band being configured to house at least two rows of balls, in which a through-hole for inserting thereinto a return path constituent member is formed in a carriage body of the carriage, and the cross-sectional shape of the through-hole is based on at least two adjacent virtual circles overlapping each other.

Advantageous Effects of Invention

According to the one aspect of the present invention, the at least two rows of balls are placed in a staggered arrangement in the ball housing band. Accordingly, many balls can be placed within limited dimensions, and increases in precision and rigidity of a motion guide apparatus can be encouraged. Moreover, the balls of the two adjacent rows enter the loaded path of the circulation path alternately. Accordingly, lower waving (higher precision) can be achieved. Furthermore, the at least two rows of balls overlap each other as viewed in the length direction of the housing band. Accordingly, the width of the ball housing band can be reduced, which in turn makes the circulation path and the motion guide apparatus compact. The reduction in the size of the circulation path also results in preventing such a deformation that spreads apart sleeve portions of the carriage, the deformation being a cause of a reduction in rigidity of the carriage of the motion guide apparatus.

According to the other aspect of the present invention, the through-hole of the carriage can be made small. Accordingly, a reduction in rigidity of the carriage can be prevented.

BRIEF DESCRIPTION OF DRAWINGS

FIGS. 10A, 10B and 10C are diagrams (FIG. 10A is a plan view, FIG. 10B is a side view, and FIG. 10C is a front view) of a ball retainer of a second embodiment of the present invention.

DESCRIPTION OF EMBODIMENTS

Embodiments of a ball housing band and a motion guide apparatus of the present invention are described hereinafter on the basis of the accompanying drawings. However, the ball housing band and the motion guide apparatus of the present invention can be embodied in various forms, and are not limited to the embodiments described in the description. The embodiments are provided with the intention of enabling those skilled in the art to fully understand the scope of the invention by fully disclosing the description.
(Ball Housing Band of First Embodiment and Motion Guide Apparatus of First Embodiment)

Figure 1:
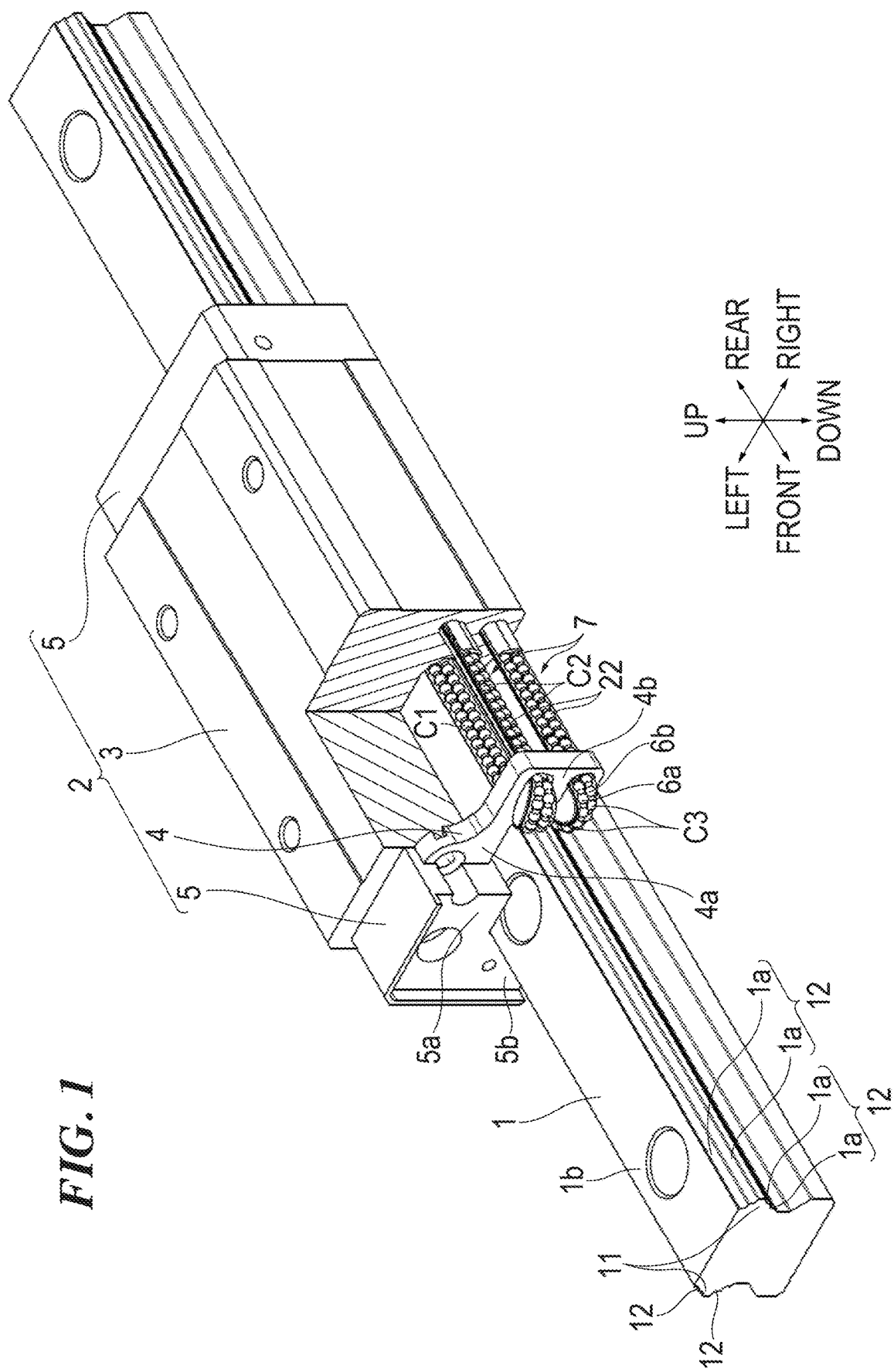
FIG. 1 is a perspective view (including a partial cross-section) of a motion guide apparatus of a first embodiment of the present invention.
Figure 2:
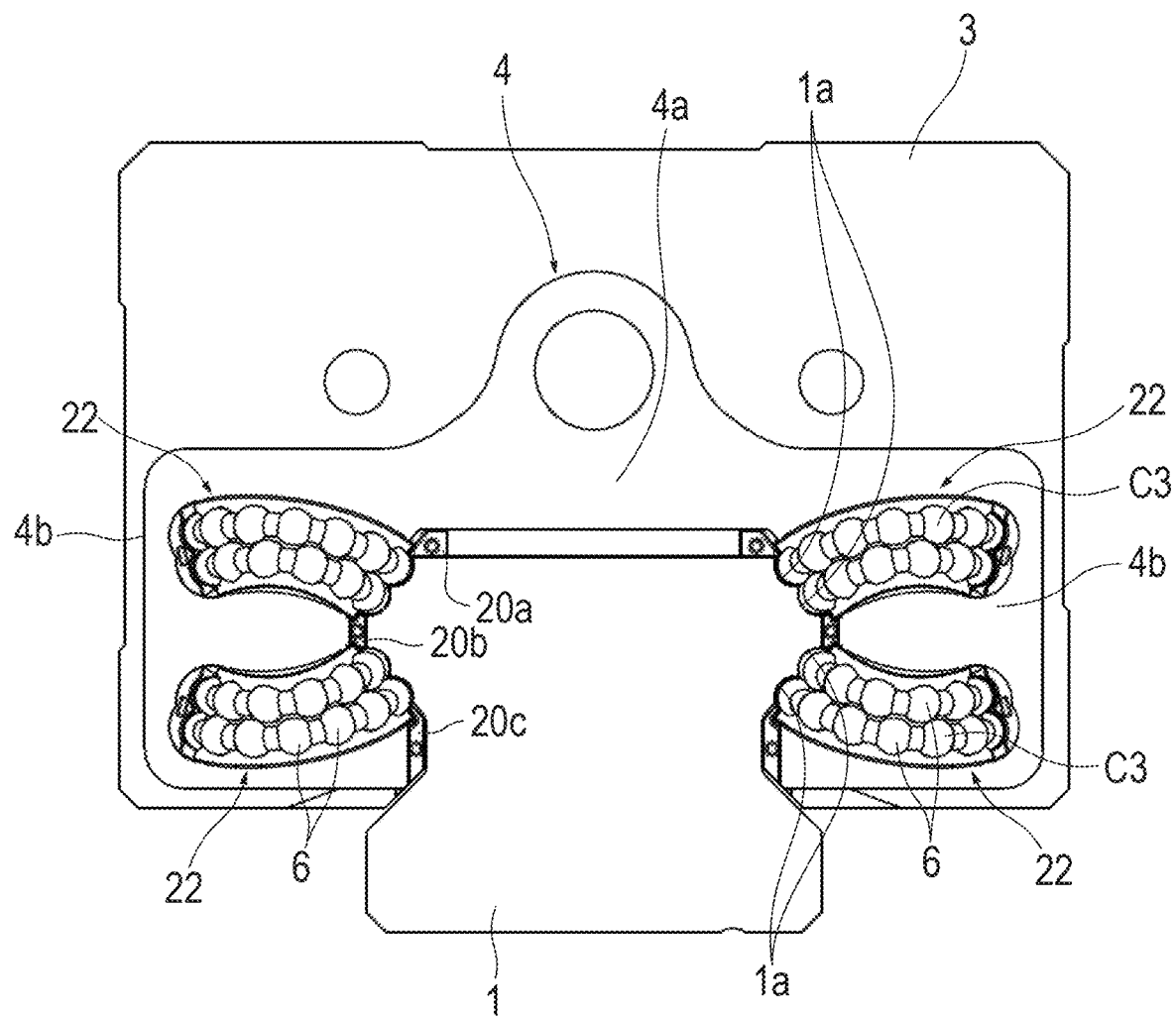
FIG. 2 is a front view of the motion guide apparatus of the embodiment in a state where an end plate has been removed.
Figure 3:
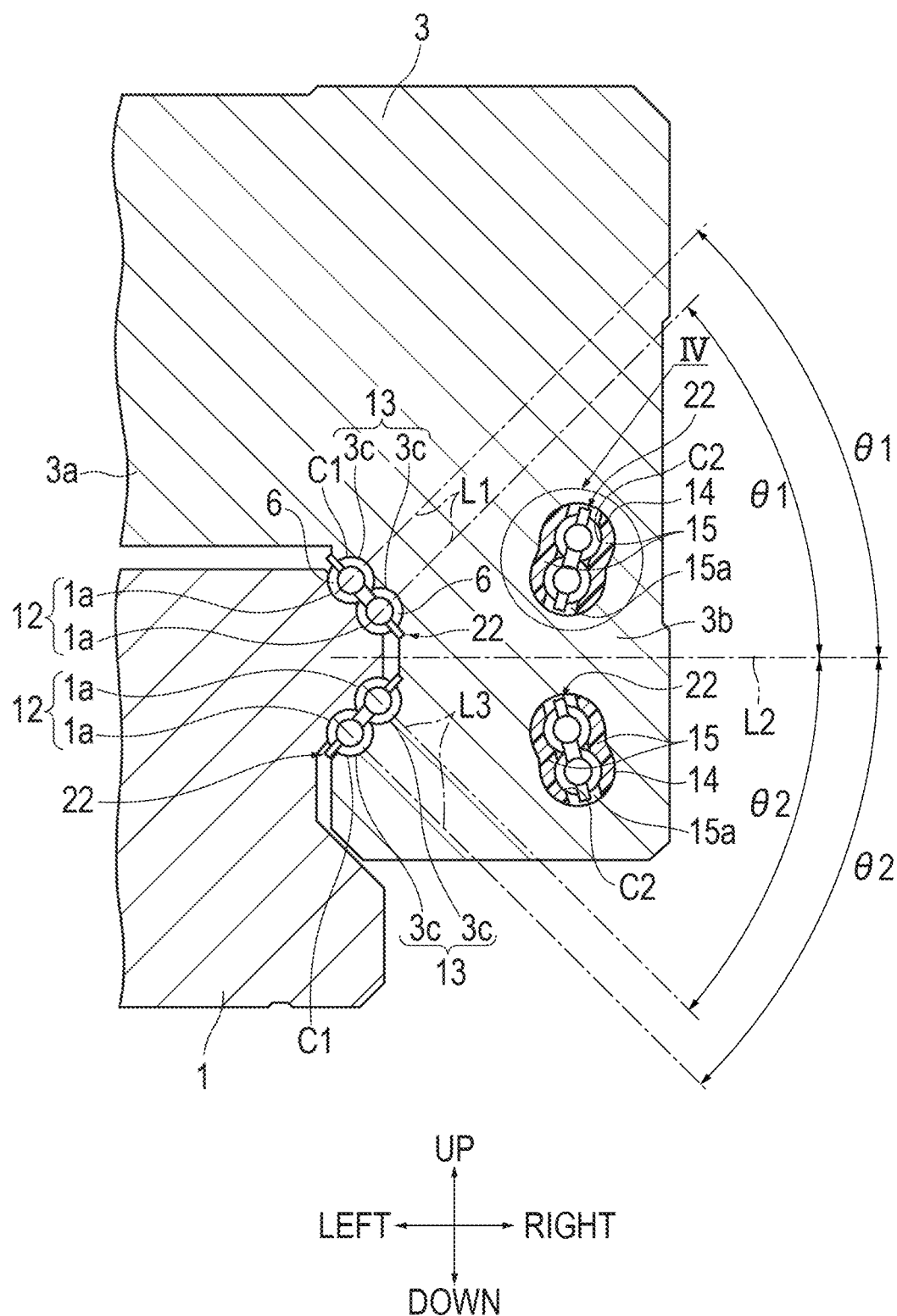
FIG. 3 is a cross-sectional view of the motion guide apparatus of the embodiment orthogonal to a direction of the relative movement of a carriage.

FIGS. 1 to 3 illustrate a motion guide apparatus where a ball retainer as a ball housing band of a first embodiment of the present invention is integrated. FIG. 1 is a perspective view of the motion guide apparatus. FIG. 2 is a front view of the motion guide apparatus where an end plate 5 has been removed. FIG. 3 is a cross-sectional view of the motion guide apparatus orthogonal to a direction of the relative movement of a carriage 2.

In the following description, for convenience of description, the configuration of the motion guide apparatus is described, using directions as the motion guide apparatus is viewed from the front when it is placed on a horizontal plane, that is, up and down, left and right, and front and rear in FIGS. 1 to 3. Naturally, the placement of the motion guide apparatus is not limited to this.

As illustrated in FIG. 1, the motion guide apparatus includes a guide rail 1 and the carriage 2 that is assembled to the guide rail 1 in such a manner as to be relatively movable. Two upper and lower track-shaped circulation paths 7 are provided on each of the left and right sides of the carriage 2. A ball retainer 22 is housed in each circulation path 7.

The guide rail 1 is long in the front and rear direction. Ridges 11 protruding in the left and right direction are formed on an upper part of the guide rail 1. Ball rolling grooves 12 are formed on the guide rail 1 in such a manner as to sandwich the ridge 11. As illustrated in FIG. 3, the cross-sectional shape of the ball rolling groove 12 has a combined shape of two arcs 1a and 1a. Each of the two arcs 1a and 1a has a slightly larger diameter than the diameter of a ball 6, and the two arcs 1a and 1a are based on two virtual circles overlapping each other (the two virtual circles are substantially equal to a circle of the ball 6). A through-hole 1b for mounting the guide rail 1 on, for example, a base is made in the guide rail 1.

As illustrated in FIG. 1, the carriage 2 includes a carriage body 3, an inner plate 4 mounted on each end surface of the carriage body 3 in the direction of the relative movement, and an end plate 5 mounted on each end surface of the carriage body 3 in such a manner as to cover the inner plate 4.

As illustrated in FIG. 3, the carriage body 3 has an inverted U-shape in cross-section (FIG. 3 illustrates only the right half, but the carriage body 3 is left-right symmetric), and includes a center portion 3a facing an upper surface of the guide rail 1, and left and right sleeve portions 3b facing side surfaces of the guide rail 1. Loaded ball rolling grooves 13 facing the ball rolling grooves 12 of the guide rail 1 are formed on the sleeve portion 3b of the carriage body 3. The cross-sectional shape of the loaded ball rolling groove 13 has a combined shape of two arcs 3c and 3c. Each of the two arcs 3c and 3c has a slightly larger diameter than the diameter of the ball 6, and the two arcs 3c and 3c are based on two virtual circles overlapping each other (the two virtual circles are substantially equal to the circle of the ball 6).

As illustrated in FIG. 1, the circulation path 7 includes a linear loaded path C1, a linear return path C2 substantially parallel to the loaded path C1, and U-shaped turn paths C3 connecting the loaded path C1 and the return path C2.

As illustrated in FIG. 3, the loaded path C1 is formed between the loaded ball rolling groove 13 of the carriage body 3 and the ball rolling groove 12 of the guide rail 1. As illustrated in FIG. 2, the carriage body 3 is provided with holding portions 20a, 20b, and 20c that hold and guide the ball retainers 22 in the loaded paths C1.

Figure 4:
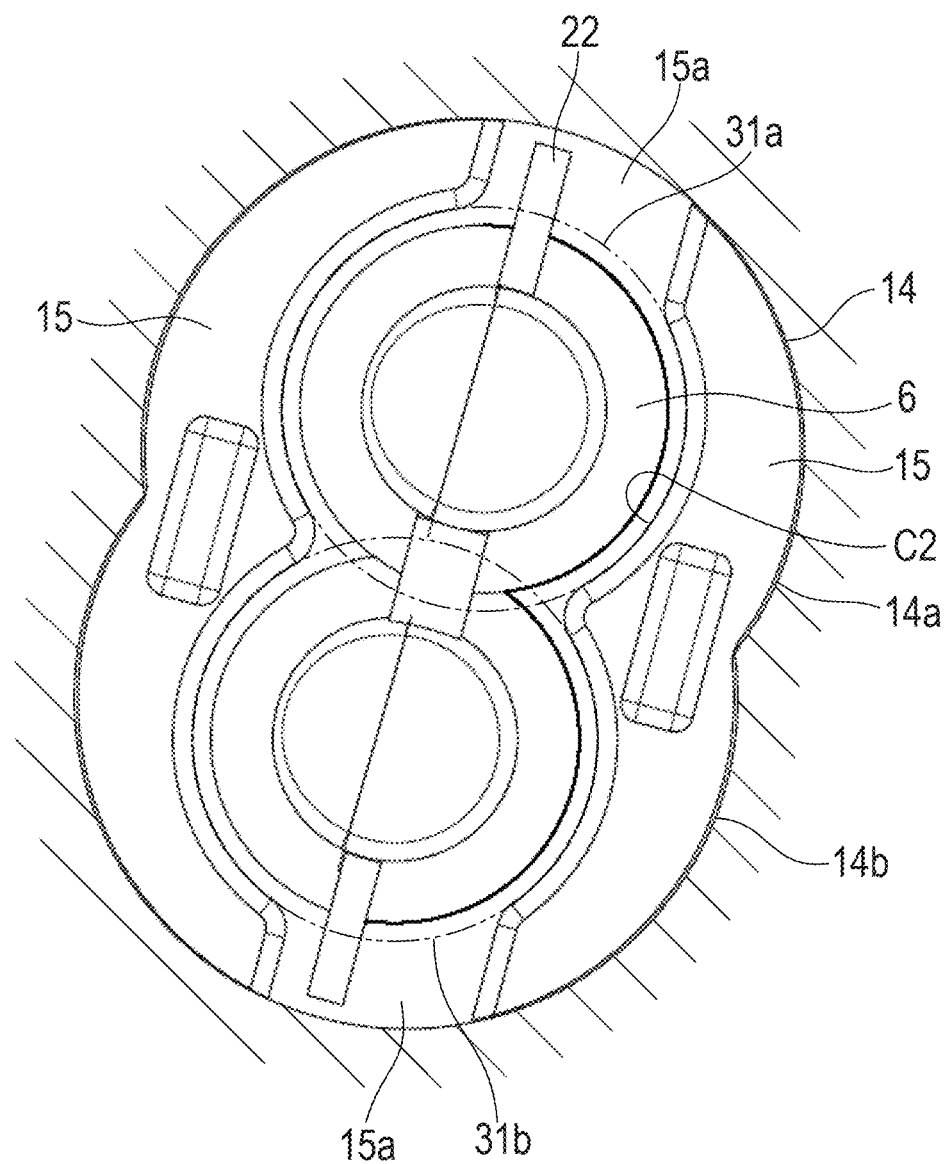
FIG. 4 is an enlarged view of IV in FIG. 3.

As illustrated in FIG. 3, through-holes 14 are formed parallel to the loaded ball rolling grooves 13 in the sleeve portion 3b of the carriage body 3. Return path constituent members 15 and 15 forming the return path C2 are inserted into the through-hole 14. As illustrated in an enlarged view of FIG. 4, the cross-sectional shape of the through-hole 14 is based on two virtual circles 14a and 14b overlapping each other. The cross-sectional shape of the return path C2 is based on two virtual circles 31a and 31b (the virtual circles 31a and 31b are indicated by chain double-dashed lines) overlapping each other. Each of the two virtual circles 31a and 31b has a slightly larger diameter than the diameter of the ball 6. A guide groove 15a that guides the ball retainer 22 in the return path C2 is formed between the return path constituent members 15 and 15.

The ball retainer 22 in the loaded path C1 and the ball retainer 22 in the return path C2 are spaced apart in an inverted V-shape in cross-section of the carriage 2 of FIG. 3. This is because the ball retainers 22 are placed perpendicularly to directions of contact angle lines L1 and L3 to ensure the contact width of the balls 6 in the loaded paths C1, and the return paths C2 are placed in positions shifted from the directions of the contact angle lines L1 and L3 to a horizontal direction L2 to make the carriage 2 compact. The contact angles of the contact angle lines L1 and L3 are θ1 and θ2.

As illustrated in FIG. 1, the turn paths C3 are formed between the inner plate 4 and the end plate 5. As illustrated in FIG. 2, the inner plate 4 has an inverted U-shape in front view, and includes a center portion 4a facing the upper surface of the guide rail 1 and a pair of left and right sleeve portions 4b facing the side surfaces of the guide rail 1. Inner sides of the turn paths C3 are formed on the sleeve portion 4b of the inner plate 4.

As illustrated in FIG. 1, the endplate 5 also has an inverted U-shape in front view, and includes a center portion 5a facing the upper surface of the guide rail 1 and a pair of left and right sleeve portions 5b facing the side surfaces of the guide rail 1. Outer sides of the turn paths C3 are formed on the sleeve portion 5b of the end plate 5. A guide groove that guides the ball retainer 22 in the turn path C3 is formed between the inner plate 4 and the end plate 5.

Figure 5A:
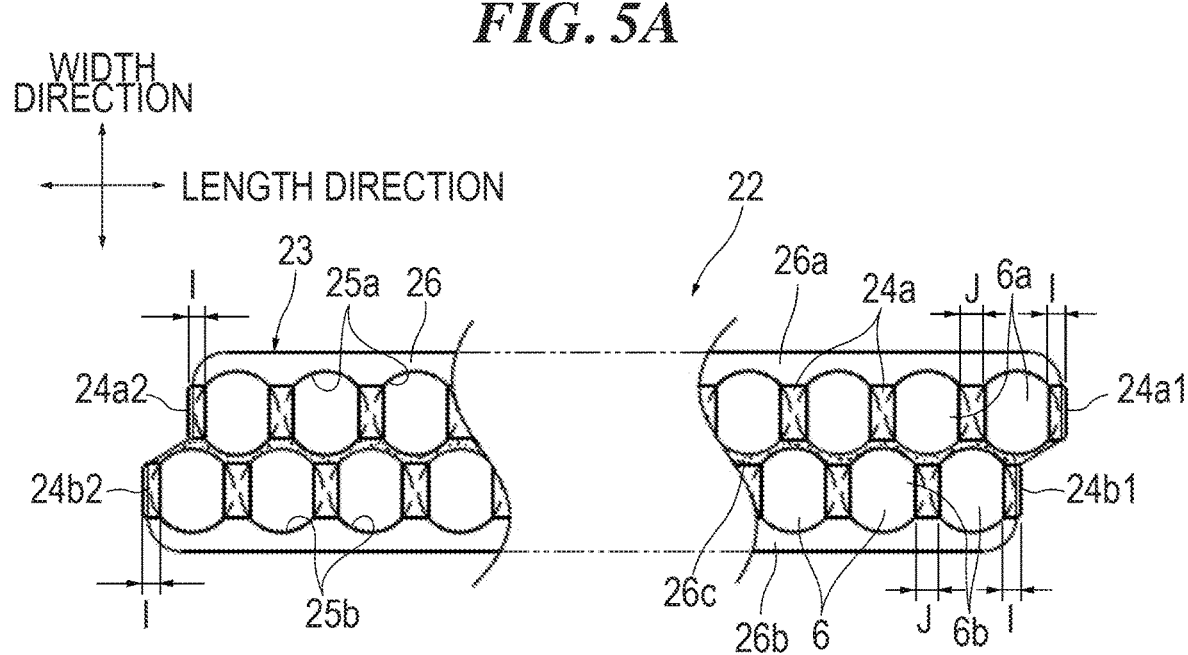
FIGS. 5A and 5B are diagrams (FIG. 5A is a plan view and FIG. 5B is a side view) illustrating a ball retainer of the first embodiment of the present invention.
Figure 5B:
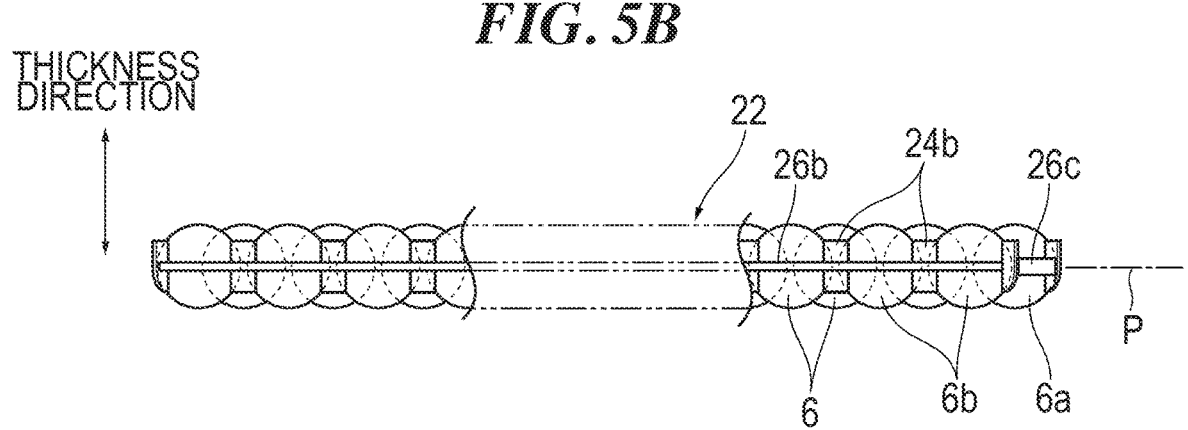

FIG. 5A illustrates a plan view of the ball retainer 22 of the embodiment. FIG. 5B illustrates a side view of the ball retainer 22 of the embodiment. As illustrated in FIGS. 5A and 5B, the ball retainer 22 extends linearly in a state of having been removed from the circulation path 7. The ball retainer 22 has flexibility to allow the ball retainer 22 to be housed in the circulation path 7 and be circulated along the circulation path 7. The ball retainer 22 is made of resin.

The ball retainer 22 includes a housing band 23 where two rows of opening portions 25a and 25b are formed in a staggered arrangement (in other words, in a zigzag arrangement), and two rows of balls 6a and 6b housed in a staggered arrangement in the two rows of opening portions 25a and 25b. The housing band 23 includes a band 26 where the two rows of opening portions 25a and 25b are formed, and a plurality of spacers 24a and 24b placed between the opening portions 25a and 25b of the rows of the band 26. The band 26 is long and slender in one direction, and is formed with ends. The spacers 24a and 24b have a substantially cylindrical shape, and each include a concave spherical portion that fits the shape of the balls 6a and 6b at each end in a length direction. The thickness (the thickness in a thickness direction in FIG. 5B) of the spacers 24a and 24b is greater than that of a middle band 26c of the band 26. The spacers 24a and 24b are designed to have a minimum length (the length in the length direction in FIG. 5A) in addition to ensuring necessary strength to allow reducing a pitch A between the balls 6a and the pitch A between the balls 6b (refer to FIG. 6A) to a minimum.

The band 26 includes side bands 26a and 26b placed respectively at both ends in a width direction in FIG. 5A, and the middle band 26c (the middle band 26c is additionally indicated by dots) disposed between one of the adjacent rows of the balls 6a and the spacers 24a and the other row of the balls 6b and the spacers 24b. The middle band 26c is formed into an undulating shape and has mountain portions and valley portions alternately at regular pitches B. The spacers 24a of the one row are integrally formed at crest portions of the mountain portions. The spacers 24b of the other row are integrally formed at trough portions of the valley portions. The side bands 26a and 26b and the middle band 26c are placed on the same plane P in a state where the ball retainer 22 is stretched in a straight line.

Figure 6A:
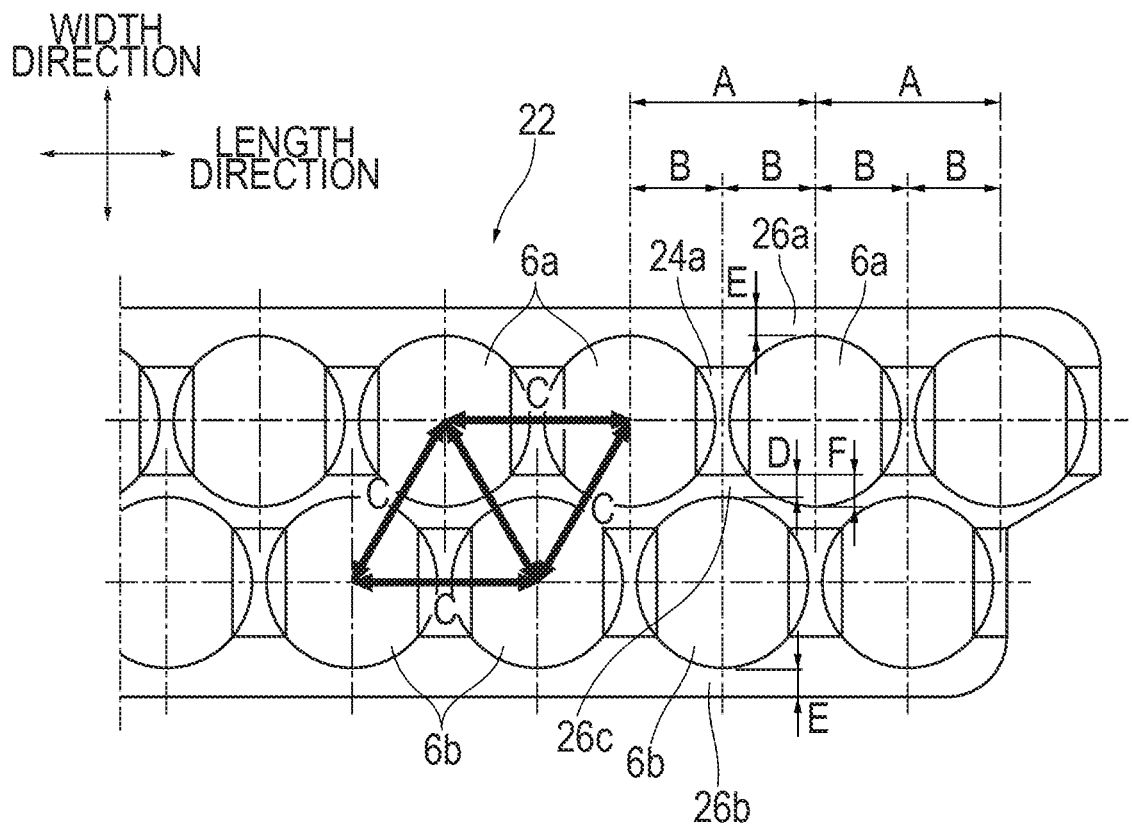
FIGS. 6A and 6B are detailed diagrams (FIG. 6A is a plan view and FIG. 6B is a front view) of the ball retainer of the embodiment.
Figure 6B:
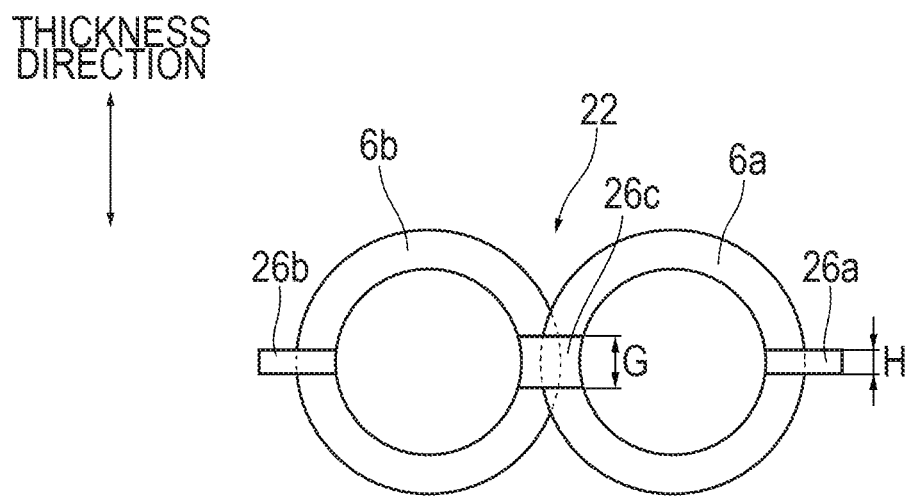

FIG. 6A illustrates a detailed plan view of the ball retainer 22. FIG. 6B illustrates a detailed front view of the ball retainer 22. As illustrated in FIG. 6A, the two adjacent rows of the balls 6a and 6b are placed, displaced in the length direction by a pitch B that is half the ball pitch A. As illustrated in FIG. 6B, the one row of the balls 6a overlap the other row of the balls 6b as viewed in the length direction of the housing band 23. Hence, as illustrated in FIG. 6A, a width D of the middle band 26c (a distance from the spacer 24a of the one row to the ball 6b of the other row in a cross-section passing the center of the ball 6b) is less than a distance F from the spacer 24a of the one row to an end of the ball 6a of the one row. Moreover, as illustrated in FIG. 5B, the one row of the balls 6a overlap the other row of the balls 6b as viewed in the width direction of the ball retainer 22. As illustrated in FIG. 6A, in plan view of the ball retainer 22, virtual triangles formed by linking the centers of adjacent three balls 6a, 6a, and 6b, and the centers of adjacent three balls 6a, 6b, and 6b are formed into regular triangles having a side C (C=A). The side C of the virtual triangle has the same length as the ball pitch A.

The width D of the middle band 26c is less than a width E of the side band 26b (which is equal to a width E of the side band 26a in a cross-section passing the center of the ball 6a) in the cross-section passing the center of the ball 6b. A thickness G of the middle band 26c is greater than a thickness H of the side bands 26a and 26b. The thickness G of the middle band 26c is equal to or greater than the width D of the middle band 26c. The cross-sectional shape of the middle band 26c is close to a square.

As illustrated in FIG. 5A, a thickness I in the length direction of end spacers 24a1, 24a2, 24b1, and 24b2 placed at both ends of the ball retainer 22 in the length direction is less than a thickness J of the remaining spacers 24a and 24b. The end spacer 24a1 of the one row and the end spacer 24b1 of the other row are formed staggered at one end of the ball retainer 22 in the length direction. The end spacer 24a2 of the one row and the end spacer 24b2 of the other row are formed staggered at the other end of the ball retainer 22 in the length direction.

Core balls that are slightly larger than the balls 6a and 6b are placed in a mold. Resin is injected into the mold. Consequently, the housing band 23 is manufactured. The core balls are removed from the housing band 23. The balls 6a and 6b are housed in the housing band instead. Consequently, the ball retainer 22 is manufactured.

Figure 7:
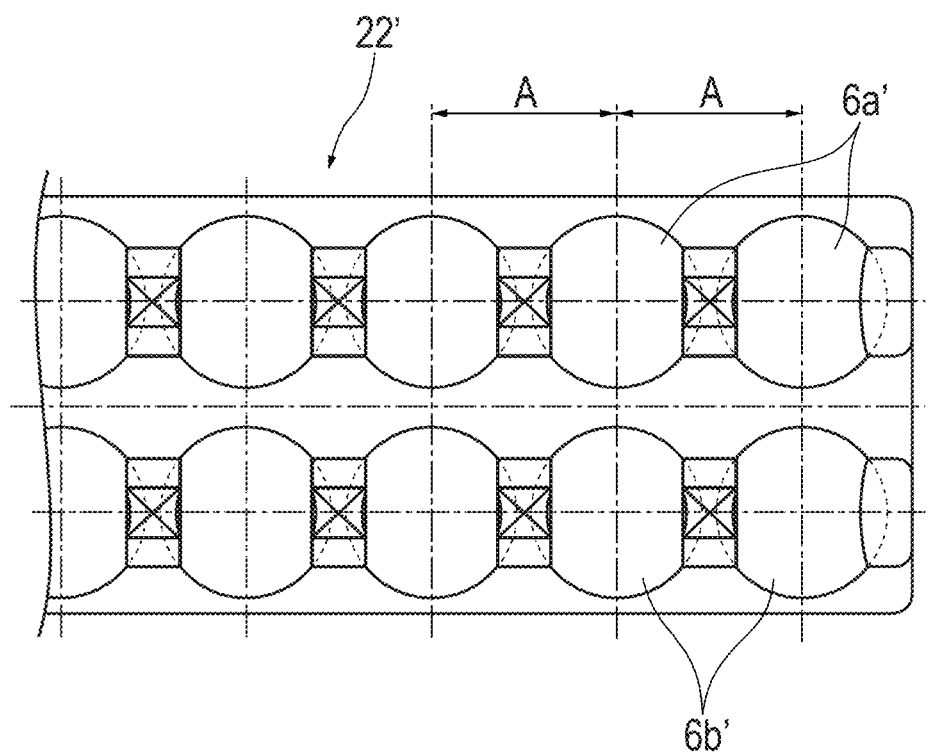
FIG. 7 is a plan view of a ball retainer of a comparative example where two rows of balls are aligned side by side.

The effects of the ball retainer 22 of the embodiment are as follows: two rows of the balls 6a and 6b are placed in a staggered arrangement in the ball retainer 22, which allows placing many balls 6a and 6b within limited dimensions, and encouraging increases in precision and rigidity of the motion guide apparatus; and the balls 6a and 6b of the two adjacent rows enter the loaded path C1 alternately, which sets the ball pitch that influences waving to B (B=A/2), and leads to a further reduction in waving. Ball passage vibrations (waving) occur during the course of the circulation of the balls 6a and 6b in the carriage 2. Waving indicates that, since the relative positions of the carriage 2 and the balls 6a and 6b change when the carriage 2 performs strokes, the number of effective balls and the balance of forces change in the carriage 2 with the change of the relative positions to cause subtle changes in attitude and vibrations. FIG. 7 illustrates a ball retainer 22' of a comparative example where two rows of balls 6a' and 6b' are aligned side by side. In a case of the comparative example, the balls 6a' and 6b' of the two rows enter the loaded path simultaneously. The ball pitch that influences waving is A. As in the embodiment, the ball pitch that influences waving is set to B (B=A/2). Accordingly, the number of effective balls per circulation path can be regarded as being double. Therefore, low waving can be achieved.

The two rows of the balls 6a and 6b overlap each other as viewed in the length direction of the ball retainer 22. Accordingly, the width of the ball retainer 22 can be reduced, which in turn makes the circulation path 7 and the motion guide apparatus compact. The through-hole 14 for inserting thereinto the return path constituent members 15 and 15 is formed in the carriage 2. The size of the through-hole 14 gives a great influence on such a deformation that spreads apart the sleeve portions 3b of the carriage body 3. A reduction in the size of the through-hole 14 allows preventing such a deformation that spreads apart the sleeve portions 3b of the carriage body 3 and preventing a reduction in the rigidity of the carriage 2.

The middle band 26c is formed into an undulating shape. Accordingly, it is possible to cause the middle band 26c to have spring characteristics in the length direction and to bend the ball retainer 22 in various manners in the circulation path 7. When the ball retainer 22 in the loaded path C1 and the ball retainer 22 in the return path C2 are placed in an inverted V-shape as in the embodiment, the ball retainer 22 bends torsionally in the turn path C3. The middle band 26c is caused to have spring characteristics. Accordingly, the ball retainer 22 can be bent torsionally and easily. Torsional bending is described below.

Figure 8A:
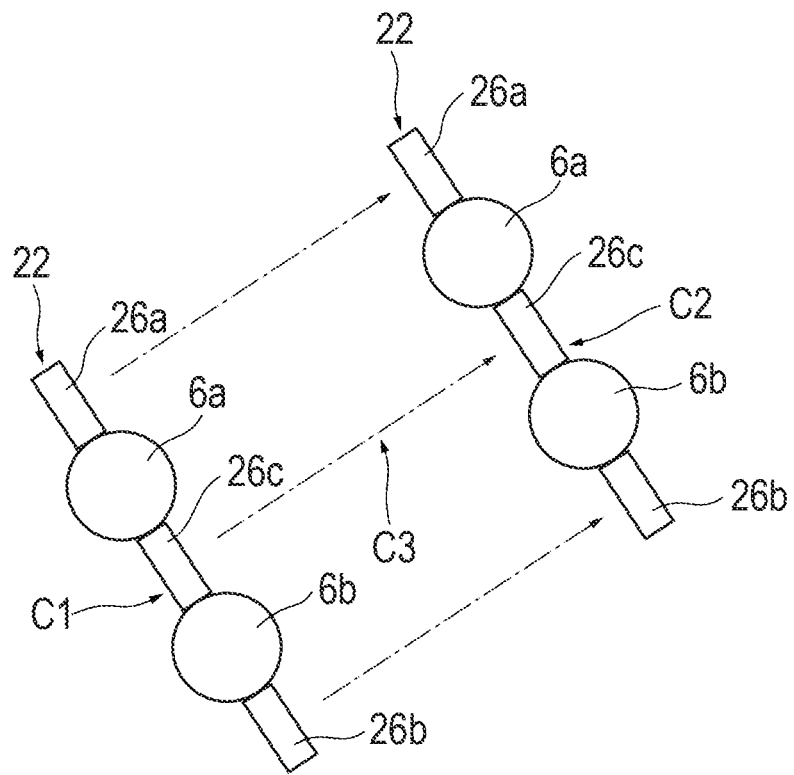
FIG. 8A is a schematic diagram of a case where the ball retainer in a loaded path and the ball retainer in a return path are placed parallel.
Figure 8B:
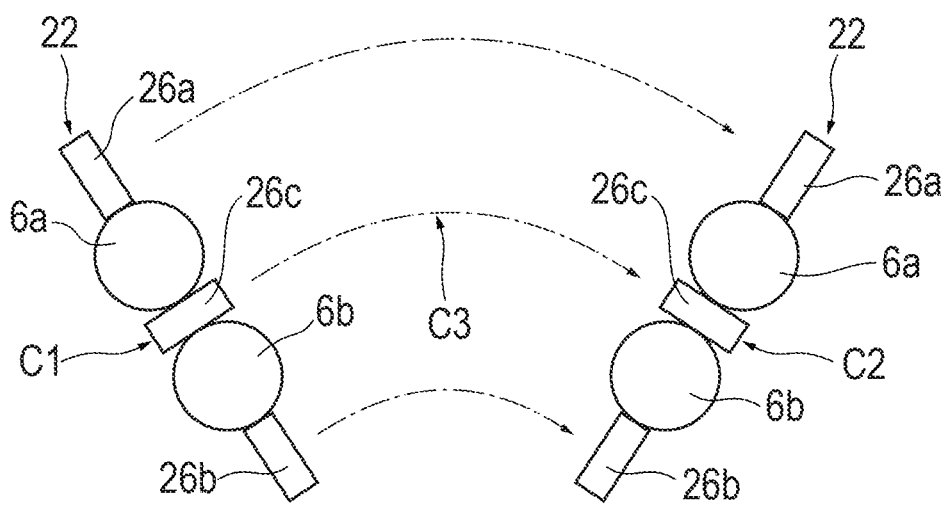
FIG. 8B is a schematic diagram of a case where the ball retainer in the loaded path and the ball retainer in the return path are placed in an inverted V-shape.

The width D of the middle band 26c is less than the width E of the side bands 26a and 26b. Accordingly, it is possible to torsionally and easily bend the ball retainer 22 in addition to ensuring an allowance to guide the ball retainer 22. This is described in detail below. If the ball retainer 22 in the loaded path C1 and the ball retainer 22 in the return path C2 are placed parallel as illustrated in FIG. 8A, the ball retainer 22 bends in the turn path C3 in a direction perpendicular to the ball retainer 22. On the other hand, if the ball retainer 22 in the loaded path C1 and the ball retainer 22 in the return path C2 are placed in an inverted V-shape as illustrated in FIG. 8B, the ball retainer 22 bends torsionally in the turn path C3 not only in the direction perpendicular to the ball retainer 22 but also in, for example, the width direction of the ball retainer 22. A necessary guide allowance needs to be ensured. Accordingly, the width E of the side bands 26a and 26b cannot be reduced. As illustrated in FIG. 8B, the width D of the middle band 26c is reduced as compared to the width E of the side bands 26a and 26b to allow the ball retainer 22 to torsionally and easily bend. If the cross-section of the middle band 26c is formed into a square, the ball retainer 22 can be bent torsionally and more easily.

The thickness G of the middle band 26c is greater than the thickness H of the side bands 26a and 26b. Accordingly, the strength of the middle band 26c with the reduced width D can be ensured.

The side bands 26a and 26b and the middle band 26c are placed on the same plane in the state where the ball retainer 22 is stretched in a straight line. Accordingly, the ball retainer 22 can be easily bent in the turn path C3.

The triangles formed by linking the centers of three adjacent balls 6a, 6a, and 6b and the centers of three adjacent balls 6a, 6b, and 6b are formed into regular triangles in plan view of the ball retainer 22. Accordingly, a maximum number of the balls 6a and 6b can be placed within limited dimensions.

Figure 9A:
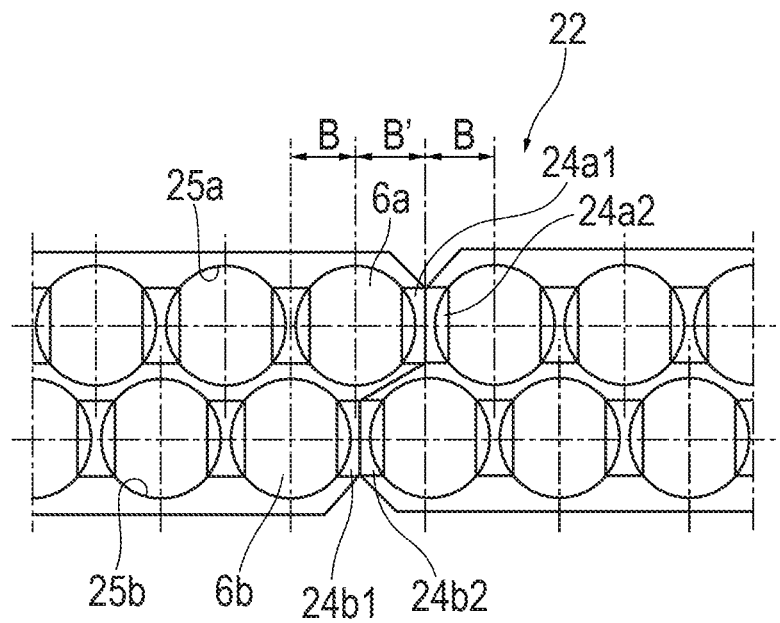
FIG. 9A illustrates a plan view of the ball retainer of the embodiment where both ends in a length direction are connected.
Figure 9B:
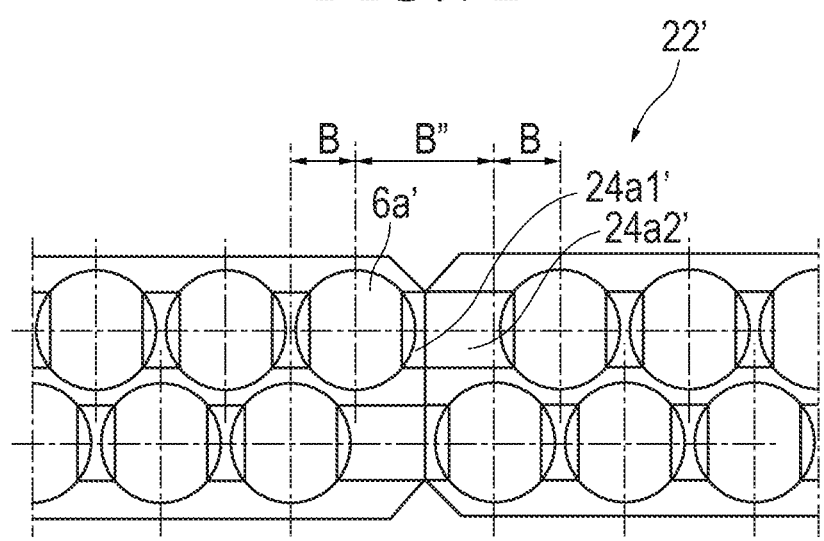
FIG. 9B illustrates a plan view of a ball retainer of a comparative example.

FIG. 9A illustrates a plan view of the ball retainer 22 of the embodiment where both ends in the length direction are connected. Both ends of the ball retainer 22 are formed staggered in such a manner as to be complementary to each other (in other words, mesh each other). Accordingly, the pitch between the ball 6a and the end spacers 24a1 and 24a2 is B'. If one end and the other end of the ball retainer 22' in the length direction are formed into straight lines as illustrated in a comparative example of FIG. 9B, the pitch between the ball 6a' and end spacers 24a1' and 24a2' is B", which is approximately the double of B'. Both ends of the ball retainer 22 in the length direction are formed staggered; accordingly, the pitch B" is reduced by half, and B and B' can be made substantially equal. The pitch B is maintained even at the connection spot; accordingly, waving can be further reduced. Moreover, as illustrated in FIG. 9A, there are no free balls between the end spacers 24a1, 24b1 at one end of the ball retainer 22 in the length direction and the end spacers 24a2, 24b2 of the other end. All the balls 6a and 6b are housed in the opening portions 25a and 25b. Accordingly, the positions of all the balls 6a and 6b can be stabilized.

The cross-sectional shapes of the loaded ball rolling groove 13 of the carriage 2 and the ball rolling groove 12 of the guide rail 1 are each based on two virtual circles overlapping each other. Accordingly, the cross-sectional shape of the loaded path C1 can be made compact.

The cross-sectional shape of the return path C2 is based on the two virtual circles 31a and 31b overlapping each other. Accordingly, the cross-sectional shape of the return path C2 can be made compact.

(Ball Retainer of Second Embodiment)

FIGS. 10A, 10B and 10C illustrate a ball retainer 32 of a second embodiment of the present invention. FIG. 10A is a plan view, FIG. 10B is a side view, and FIG. 10C is a front view. In the second embodiment, three rows of balls 6a, 6b, and 6c are placed in a staggered arrangement in the ball retainer 32. A housing band 33 includes a band 36 having three rows of opening portions 35a, 35h, and 35c, and a plurality of spacers 34 placed between the opening portions 35a, 35b, and 35c of the rows. The three rows of the balls 6a, 6b, and 6c are placed in a staggered arrangement in the three rows of the opening portions 35a, 35b, and 35c of the housing band 33. The placement of the ball 6a of the first row and the ball 6b of the second row are displaced by half the ball pitch of the ball retainer 32 in a length direction. The placement of the ball 6b of the second row and the ball 6c of the third row is also displaced by half the ball pitch of the ball retainer 32 in the length direction. The placement of the ball 6a of the first row and the ball 6c of the third row is displaced by the ball pitch of the ball retainer 32 in the length direction.

As illustrated in FIG. 10C, of the three rows of the balls 6a, 6b, and 6c, two adjacent rows of the balls 6a and 6b overlap each other, and two adjacent rows of the balls 6b and 6c overlap each other, as viewed in the length direction of the ball retainer 32.

As illustrated in FIG. 10A, the housing band 33 includes side bands 36a and 36b placed respectively at both ends of the housing band 33 in a width direction, a first middle band 36c placed between the first row of the balls 6a and the second row of the balls 6b, and a second middle band 36d placed between the second row of the balls 6b and the third row of the balls 6c. The shapes of the side bands 36a and 36b, the first middle band 36c, and the second middle band 36d are substantially the same as those of the side bands 26a and 26b and the middle band 26c of the ball retainer 22 of the first embodiment.

One end of the ball retainer 32 in the length direction is formed staggered with two level differences. The other end of the ball retainer 32 in the length direction is formed staggered with two level differences, which is complementary to the one end.

According to the ball retainer 32 of the second embodiment, the three rows of the balls 6a, 6b, and 6c are placed in a staggered arrangement in the ball retainer 32. Accordingly, more balls 6a, 6b, and 6c can be placed within limited dimensions, and further increases in precision and rigidity of the motion guide apparatus can be encouraged.

(Motion Guide Apparatus of Second Embodiment)

Figure 11:
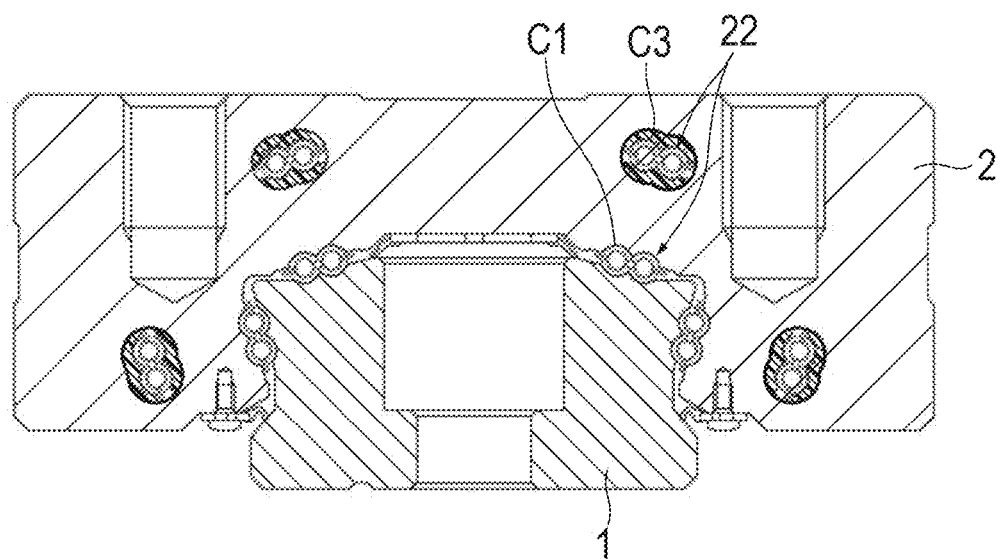
FIG. 11 is a cross-sectional view of a motion guide apparatus of the second embodiment of the present invention.

FIG. 11 illustrates a cross-sectional view of a motion guide apparatus of the second embodiment of the present invention. The ball retainer 22 of the first embodiment is integrated into the circulation path 7 in the motion guide apparatus of the second embodiment. A point that the ball retainer 22 in the loaded path C1 and the ball retainer 22 in the return path C2 are placed parallel is different from the motion guide apparatus of the first embodiment. The other configurations are substantially the same as those of the motion guide apparatus of the first embodiment. Accordingly, the same reference signs are assigned to the other configurations and their descriptions are omitted.

(Motion Guide Apparatus of Third Embodiment)

Figure 12:
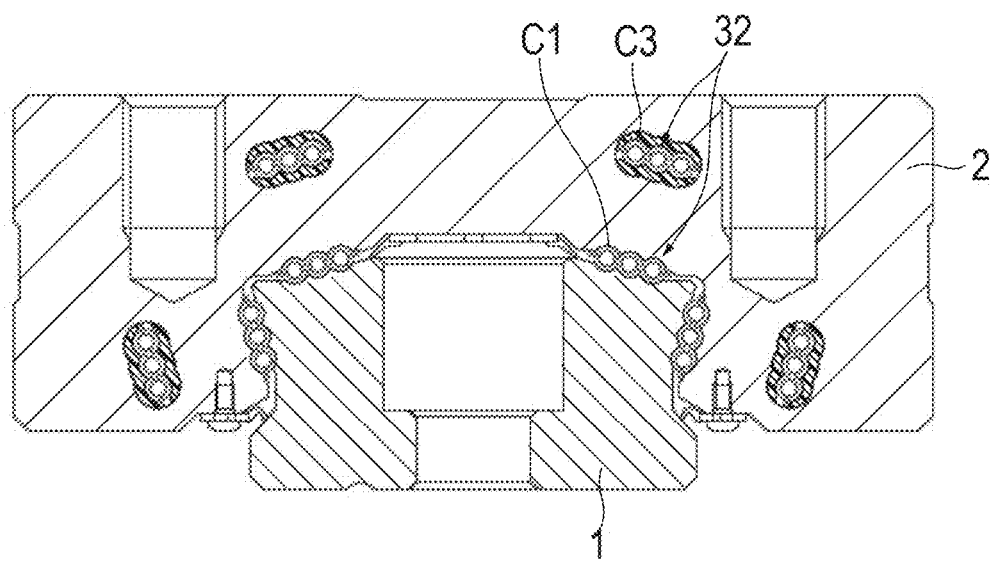
FIG. 12 is a cross-sectional view of a motion guide apparatus of a third embodiment of the present invention.

FIG. 12 illustrates a cross-sectional view of a motion guide apparatus of a third embodiment of the present invention. The ball retainer 32 of the second embodiment is integrated into the circulation path 7 in the motion guide apparatus of the third embodiment. The ball retainer 32 in the loaded path C1 and the ball retainer 32 in the return path C2 are placed parallel. The other configurations are substantially the same as those of the motion guide apparatus of the first embodiment. Accordingly, the same reference signs are assigned to the other configurations, and their descriptions are omitted.

Example

Figure 13A:
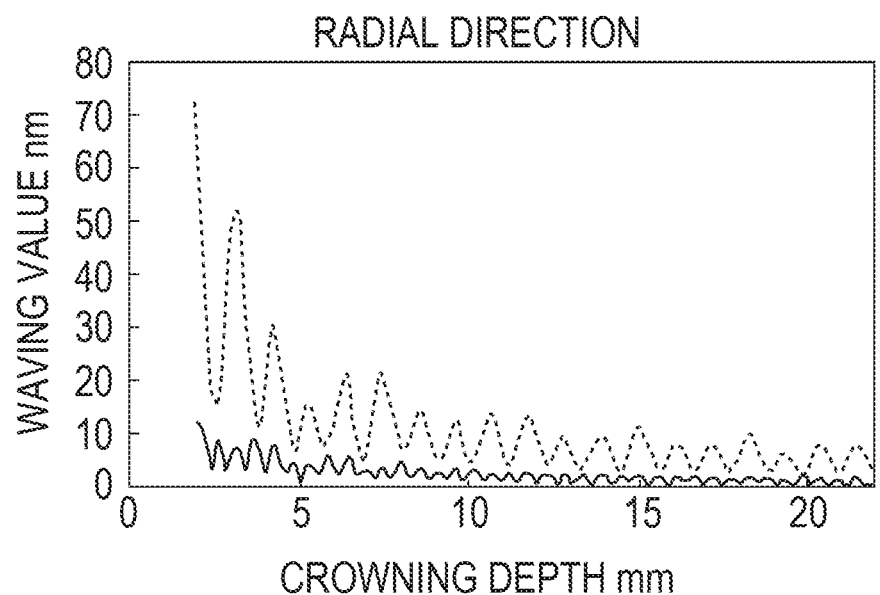
FIGS. 13A and 13B are graphs illustrating waving analysis results (FIG. 13A illustrates a waving value in a radial direction, and FIG. 13B illustrates the waving value in a pitch direction.
Figure 13B:
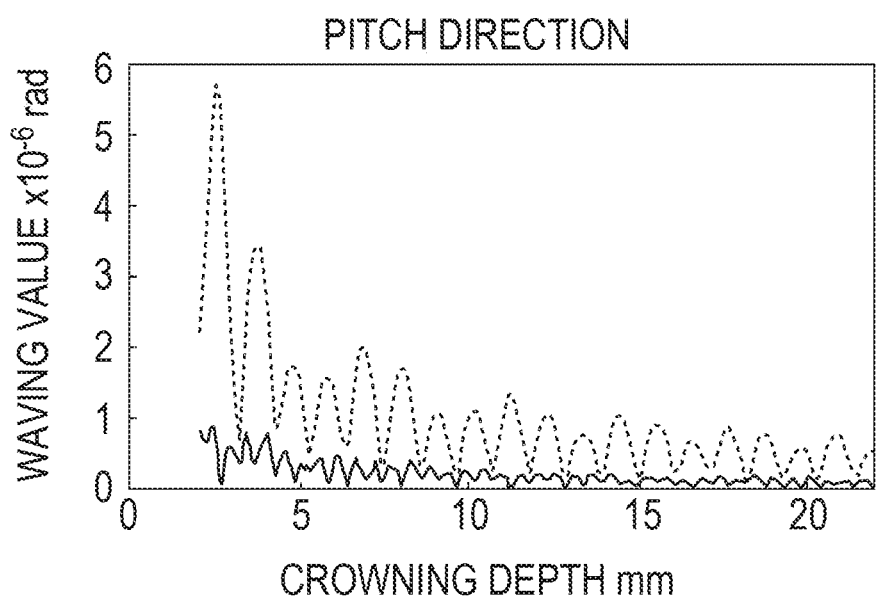

A waving analysis of the motion guide apparatus was carried out. The motion guide apparatus illustrated in FIG. 1 was used for the analysis. The groove conformity was set f=0.515. In order to verify superiority in the staggered arrangement, the analysis was carried out for both of a case where two rows of the balls 6a' and 6b' were placed side by side (refer to FIG. 7) and a case where two rows of the balls 6a and 6b were placed in a staggered arrangement (refer to FIG. 6A). The analysis conditions were: the load Fz=5 kN, no preload, and the crowning depth=the maximum elastic deformation amount+5 μm. FIGS. 13A and 13B illustrate results of the analysis in the radial direction and the pitch direction.

Solid lines of FIGS. 13A and 13B indicate the waving value in the case where the two rows of the balls 6a and 6b were placed in a staggered arrangement. Broken lines of FIGS. 13A and 13B indicate the waving value in the case where the two rows of the balls 6a' and 6b' were placed side by side. It can be seen from a comparison between them that, in the case where the two rows of the balls 6a and 6b were placed in a staggered arrangement, the number of fluctuations is double the number of fluctuations in the case where the two rows of the balls 6a' and 6b' were placed side by side, but the waving value fell significantly. This indicates that if the two rows of the balls 6a and 6b are placed in a staggered arrangement, the pitch between the balls entering the loaded path C1 is reduced by half; accordingly, the number of vibrations increases but the amplitude per entrance is reduced. It could be verified that the staggered arrangement of the two rows of the balls 6a and 6b can achieve low waving.

The present invention is not limited to the above embodiments, and can be modified in various manners within the scope that does not change the gist of the present invention.

In the above embodiments, one ball retainer is placed in the circulation path. However, it is also possible to place two, three, four, or more ball retainers.

In the ball retainers of the above embodiments, the concave spherical portions are formed on the spacer to allow the ball retainer to hold the balls. However, the spacer can also be formed into, for example, a plate shape so as not to allow the ball retainer to hold the balls.

The description is based on JP 2017-076499 A filed on Apr. 7, 2017, the entire contents of which are incorporated herein.

REFERENCE SIGNS LIST

1 Guide rail
2 Carriage
6, 6a, 6b, 6c Ball
7 Circulation path
12 Ball rolling groove
13 Loaded ball rolling groove
22 Ball retainer (ball housing band)
23 Housing band
24a, 24b Spacer
24a1, 24a2, 24b1, 24b2 End spacer
25a, 25b Opening portion
26 Band
26a, 26b Side band
26c Middle band
31a, 31b Virtual circle
32 Ball retainer (ball housing band)
33 Housing band
34 Spacer
35a, 35b, 35c Opening portion
36 Band
36a, 36b Side band
36c First middle band (middle band)
36d Second middle band (middle band)
C1 Loaded path
C2 Return path
C3 Turn path
D Width of the middle band
E Width of the side band
G Thickness of the middle band
H Thickness of the side band
I Thickness of the end spacer in the length direction
J Thickness of the spacer in the length direction
P Plane

The invention claimed is:

1. A ball housing band comprising:
a housing band including a band formed with ends, the band having at least two rows of opening portions, and a plurality of spacers placed between the opening portions of the rows; and
at least two rows of balls housed in the at least two rows of opening portions, wherein
one of adjacent rows of the balls and the other row of the balls are placed in a staggered arrangement in a non-contact state, and
the one row of the balls overlap the other row of the balls as viewed in an arrangement direction of each row of the balls.

2. The ball housing band according to claim 1, wherein the housing band includes side bands placed respectively at both ends of the housing band in a width direction, and a middle band disposed between the one of the adjacent rows of the balls and the spacers and the other row of the balls and the spacers.

3. The ball housing band according to claim 2, wherein the width of the middle band is less than the width of the side band in a cross-section passing the center of the ball.

4. The ball housing band according to claim 2, wherein the thickness of the middle band is greater than the thickness of the side band.

5. The ball housing band according to claim 2, wherein the side bands and the middle band are placed on the same plane in a state where the ball housing band is stretched in a straight line.

6. The ball housing band according to claim 2, wherein
the one row of the balls overlap the other row of the balls as viewed in the width direction of the ball housing band, and
a virtual triangle formed by linking centers of three adjacent balls is formed into a regular triangle in plan view of the ball housing band.

7. The ball housing band according to claim 2, wherein
a length in the length direction of an end spacer placed at each end of the ball housing band in the length direction is less than the length of the remaining spacers,
the end spacer of the one row and the end spacer of the other row are formed staggered at one end of the ball housing band in the length direction,
the end spacer of the one row and the end spacer of the other row are formed staggered at the other end of the ball housing band in the length direction in such a manner as to be complementary to the staggered end, and
there are no balls between the end spacer at the one end of the ball housing band and the end spacer at the other end of the ball housing band.

8. The ball housing band according to claim 3, wherein the thickness of the middle band is greater than the thickness of the side band.

9. The ball housing band according to claim 3, wherein the side bands and the middle band are placed on the same plane in a state where the ball housing band is stretched in a straight line.

10. The ball housing band according to claim 4, wherein the side bands and the middle band are placed on the same plane in a state where the ball housing band is stretched in a straight line.

11. The ball housing band according to claim 3, wherein
the one row of the balls overlap the other row of the balls as viewed in the width direction of the ball housing band, and
a virtual triangle formed by linking centers of three adjacent balls is formed into a regular triangle in plan view of the ball housing band.

12. The ball housing band according to claim 4, wherein
the one row of the balls overlap the other row of the balls as viewed in the width direction of the ball housing band, and
a virtual triangle formed by linking centers of three adjacent balls is formed into a regular triangle in plan view of the ball housing band.

13. The ball housing band according to claim 5, wherein
the one row of the balls overlap the other row of the balls as viewed in the width direction of the ball housing band, and
a virtual triangle formed by linking centers of three adjacent balls is formed into a regular triangle in plan view of the ball housing band.

14. The ball housing band according to claim 1, wherein
the one row of the balls overlap the other row of the balls as viewed in the width direction of the ball housing band, and
a virtual triangle formed by linking centers of three adjacent balls is formed into a regular triangle in plan view of the ball housing band.

15. The ball housing band according to claim 1, wherein
a length in the length direction of an end spacer placed at each end of the ball housing band in the length direction is less than the length of the remaining spacers,
the end spacer of the one row and the end spacer of the other row are formed staggered at one end of the ball housing band in the length direction,
the end spacer of the one row and the end spacer of the other row are formed staggered at the other end of the ball housing band in the length direction in such a manner as to be complementary to the staggered end, and
there are no balls between the end spacer at the one end of the ball housing band and the end spacer at the other end of the ball housing band.

16. The ball housing band according to claim 1, wherein
the housing band includes three rows of the opening portions,
three rows of the balls are placed in the three rows of the opening portions in a staggered arrangement, and
of the three rows of the balls, two adjacent rows of the balls overlap each other as viewed in the length direction of the ball housing band.

17. A motion guide apparatus comprising:
a guide rail;
a carriage assembled to the guide rail in such a manner as to be relatively movable, the carriage including a circulation path having a loaded path, a return path substantially parallel to the loaded path, and a turn path connecting the loaded path and the return path; and
the ball housing band according to claim 1 placed in the circulation path.

18. The motion guide apparatus according to claim 17, wherein
the loaded path includes a ball rolling groove of the guide rail and a loaded ball rolling groove of the carriage, and
the cross-sectional shapes of the loaded ball rolling groove of the carriage and the ball rolling groove of the guide rail are each based on two virtual circles overlapping each other, each of the two virtual circles having a slightly larger diameter than a diameter of the ball.

19. The motion guide apparatus according to claim 17, wherein the cross-sectional shape of the return path is based on two virtual circles overlapping each other, each of the two virtual circles having a slightly larger diameter than a diameter of the ball.

20. A motion guide apparatus comprising:
a guide rail;
a carriage assembled to the guide rail in such a manner as to be relatively movable, the carriage including a circulation path having a loaded path, a return path substantially parallel to the loaded path, and a turn path connecting the loaded path and the return path; and
a ball housing band placed in the circulation path, the ball housing band being configured to house at least two rows of balls, wherein a through-hole for inserting thereinto a return path constituent member is formed in a carriage body of the carriage, the return path constituent member forming the return path, and the cross-sectional shape of the through-hole is based on at least two adjacent virtual circles overlapping each other as viewed in a cross-section orthogonal to a direction of a relative movement of the carriage.

* * * * *